(12) United States Patent
Zhang et al.

(10) Patent No.: US 12,244,467 B2
(45) Date of Patent: Mar. 4, 2025

(54) DISTRIBUTED NETWORK TRAFFIC DATA DECOMPOSITION METHOD

(71) Applicant: THE UNIVERSITY COURT OF THE UNIVERSITY OF EDINBURGH, Edinburgh (GB)

(72) Inventors: Chaoyun Zhang, Edinburgh (GB); Paul Patras, Edinburgh (GB); Marco Fiore, Edinburgh (GB)

(73) Assignee: THE UNIVERSITY COURT OF THE UNIVERSITY OF EDINBURGH, Edinburgh (GB)

( * ) Notice: Subject to any disclaimer, the term of this patent is extended or adjusted under 35 U.S.C. 154(b) by 0 days.

(21) Appl. No.: 17/912,150

(22) PCT Filed: Mar. 16, 2021

(86) PCT No.: PCT/GB2021/050644
§ 371 (c)(1),
(2) Date: Sep. 16, 2022

(87) PCT Pub. No.: WO2021/186158
PCT Pub. Date: Sep. 23, 2021

(65) Prior Publication Data
US 2023/0134964 A1    May 4, 2023

(30) Foreign Application Priority Data
Mar. 17, 2020    (GB) .................................. 2003857

(51) Int. Cl.
*H04L 41/147* (2022.01)
*H04L 41/16* (2022.01)
*H04L 43/028* (2022.01)

(52) U.S. Cl.
CPC ............ *H04L 41/147* (2013.01); *H04L 41/16* (2013.01); *H04L 43/028* (2013.01)

(58) Field of Classification Search
CPC .............................. H04L 41/147; H04L 41/16
See application file for complete search history.

(56) References Cited

U.S. PATENT DOCUMENTS

| 11,481,598 B2 * | 10/2022 | Khapali ................ G06N 3/04 |
| 2014/0310517 A1 * | 10/2014 | Christodorescu ..... H04L 41/142 713/160 |

(Continued)

OTHER PUBLICATIONS

Zhang, Chaoyun, Marco Fiore, Iain Murray, and Paul Patras, "CloudLSTM: A Recurrent Neural Model for Spatiotemporal Point-Cloud Stream Forecasting", Cornell University, Sep. 25, 2019, Accessed at: https://arxiv.org/abs/1907.12410v2. (Year: 2019).*
Ouyang, Wenli, Yahong Zhang, Mingda Zhu, Xiuling Zhang, Hongye Chen, Yinghao Ren, and Wei Fan, "Interpretable Spatial-Temporal Attention Graph Convolution Network for Service Part Hierarchical Demand Forecast", Natural Language Processing and Chinese Computing: 8th CCF International Conference, 2019. (Year: 2019).*

(Continued)

*Primary Examiner* — Nam T Tran
(74) *Attorney, Agent, or Firm* — Foley & Lardner LLP

(57) ABSTRACT

To be able to adequately provide desired services over a 5G mobile service network, the 5G communication infrastructures requires a much-improved flexibility in resource management. Network operators are foreseen to deploy network slicing, by isolating dedicated resources and providing customised logical instances of the physical infrastructure to each service. A critical operation in performing management and orchestration of network resources is the anticipatory provisioning of isolated capacity to each network slice. Accordingly, it is necessary to obtain an estimate of service level demands. However, the estimation of such service level demands is typically obtained via deep packet inspection, which is a resource intensive and time-consuming process. Therefore, it is typically not possible to provide updated accurate estimates at a frequency suitable for use in accurate prediction of a future per-service traffic consumption, without an undesirable level of computational and time resources being required. The present invention provides a distributed network traffic data decomposition method (Continued)

which makes use of a neural network to provide an accurate future per-service traffic consumption prediction without deep-packet inspection or another resource intensive analysis method.

30 Claims, 1 Drawing Sheet

(56) References Cited

U.S. PATENT DOCUMENTS

| | | | |
|---|---|---|---|
| 2019/0281476 A1* | 9/2019 | Lyon | H04L 41/16 |
| 2019/0372857 A1* | 12/2019 | Gandhi | H04L 41/147 |
| 2021/0021479 A1* | 1/2021 | Chandran | H04L 41/5054 |
| 2021/0150305 A1* | 5/2021 | Amiri | H04L 41/145 |

OTHER PUBLICATIONS

International Search Report and Written Opinion form the PCT/GB2021/050644.

Chaoyun Zhang et al: "CloudLSTM: A Recurrent Neural Model for Spatiotemporal Point-cloud Stream Forecasting"; arxiv. org, Cornell University, Ithaca, NY, 14853, Jul. 29, 2019, XP081497406.

Ouyang Wenli et al: "Interpretable Spatial-Temporal Attention Graph Convolution Network for Service Part Hierarchical Demand Forecast"; Sep. 30, 2019, $12^{th}$ European Conference on Computer Vision, ECCV 2012; Lecture Notes in Computer Science, Springer Berlin Heidelberg, Berlin, Germany, pp. 575-586, XP047521767.

International Preliminary Report on Patentability for PCT Appl. Ser. No. PCT/GB2021/050644 dated Sep. 20, 2022 (9 pages).

* cited by examiner

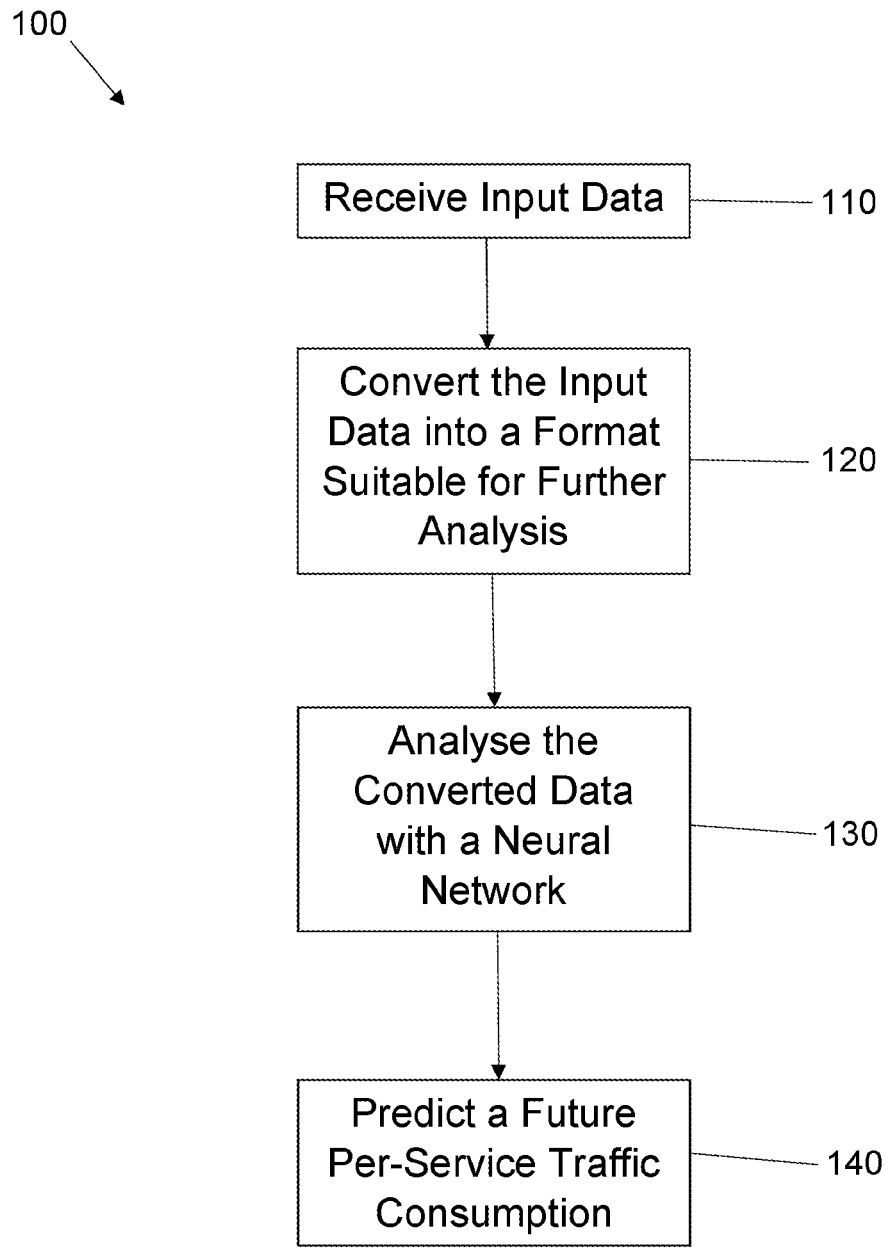

DISTRIBUTED NETWORK TRAFFIC DATA DECOMPOSITION METHOD

CROSS-REFERENCE TO RELATED APPLICATIONS

This application claims the benefit of priority to International Application No. PCT/GB2021/050644, filed on Mar. 16, 2021, which claims the benefit of Great Britain Patent Application No. 2003857.6, filed Mar. 17, 2020, which is hereby incorporated by reference in its entirety.

FIELD OF THE INVENTION

The present invention relates to a method and apparatus for decomposing traffic data from a distributed network and finds particular, although not exclusive, utility in providing a method for predicting a future per-service traffic consumption of services operating over the distributed network.

BACKGROUND TO THE INVENTION

The next generation of mobile networks will become a dominant General Purpose Technology and enable new services to operate. As such, 5G networks must fulfil a growing variety of quality of service requirements, ranging from extreme mobile broadband for ultra-high-definition streaming, to ultra-reliable low-latency communication for autonomous driving. To be able to adequately provide these services, 5G mobile communication infrastructures require a much-improved flexibility in resource management.

Typically, this will be realised via virtualisation of network functions, including dynamic spectrum allocation, baseband processing, scheduling or task containerisation including allocation to one or more tenants. Furthermore, operators are foreseen to deploy network slicing, by isolating dedicated resources and providing customised logical instances of the physical infrastructure to each tenant. Tenants may obtain full control of the resources and functions allocated within the slice they hold, driven by their precise knowledge of end-to-end service performance. In such scenarios, network operators remain in charge of performing management and orchestration of resources dedicated to each slice. A critical operation in performing management and orchestration of resources is the anticipatory provisioning of isolated capacity to each slice. Accordingly, it is necessary to obtain at least an estimate of service level demands.

However, the estimation of such service level demands is typically obtained via deep packet inspection, which is a resource intensive and time-consuming process.

Therefore, it is typically not possible to provide updated accurate estimates at a frequency suitable for use in accurate prediction of a future per-service traffic consumption, without an undesirable level of computational and time resources being required.

Objects and aspects of the present invention seek to alleviate at least these problems with prior known prediction methods.

SUMMARY OF THE INVENTION

According to a first aspect of the present invention, there is provided a distributed network traffic data decomposition method comprising the steps of: receiving input data comprising aggregate network traffic data from a plurality of distributed source locations, wherein the aggregate data includes traffic data corresponding to a plurality of services operating over the network; converting the input data into a format suitable for further analysis by re-arranging and mapping the locations of the plurality of source locations such that the source locations are arranged in a regular grid pattern and separating the aggregate network traffic data into a time-dependent sequence of snapshots; analysing the converted data with a neural network, comprising a plurality of neural layers, to extract, in a final neural layer of the plurality of neural layers, a plurality of outputs from the converted data, wherein each output corresponds to decomposed traffic volume of one service of the plurality of services operating over the network; and predicting, based on the plurality of outputs, a future per-service traffic consumption.

A key advantage of the present invention is that an accurate prediction of future per-service traffic consumption is obtainable without requiring relatively resource intensive analysis, such as deep packet inspection or similar. The use of the method of the first aspect of the present invention has been found via experimentation to result in estimation errors, relative to the traffic variance interval, below 1.2%.

The step of analysing the converted data with a neural network may include any or each of: determining a fraction of traffic that belongs to each of the plurality of services at each of the plurality of sources; employing 3D deformable convolutions to: at least partially mitigate spatial displacements introduced during the conversion of the input data; and determine at least one intermediate output from the converted data; determining spatiotemporal correlations from the determined at least one intermediate output; and employing 2D convolutions to extract a plurality of outputs from the determined spatiotemporal correlations.

The distributed network may be a system of interconnected nodes, wherein the nodes are spaced apart. The nodes may be spaced apart by distances in the order of metres, or kilometres. For example, the nodes may be antennae for use in a mobile telecoms network, and the antennae may be distributed across an urban area. Each node may be connected to each other node in the network. Each node may be connected to a single, central node, such as a data centre. Connected may mean physically connected, such as with a wire, a data bus, and/or any other known apparatus. Alternatively, connected may mean wirelessly connected. The connectivity may make use of any known wired or wireless protocol.

The network may be one of a WiFi network, a mobile telecoms service network, a broadband network, an Internet of Things sensor and actuators network, a distributed electricity distribution grid, a network of electricity consumption sensors, roadways, airways, shipping lanes, a network of air quality sensors, a network of household water or gas consumption meters, or a social network.

Traffic may be anything which moves around a network, from node to node. For example, in a mobile telecoms service network, traffic may be data packets moving between mobile devices. As a further example, in a roadway network, traffic may be vehicles traversing the roadways.

Traffic data may be data related to the number, frequency, speed, size, or any other characteristic of the traffic.

Decomposition may mean taking a single, aggregate, data stream and converting it into a plurality of constituent data streams.

Receiving input data may mean that the input data is collected and conveyed to apparatus configured to carry out the method. The method may further comprise the step of collecting the input data. The step of collecting the input data may comprise data collection without deep packet inspection. In this way, the input data may be collected, rather than received.

Aggregate network traffic data may be a summation of network traffic data over the network. The aggregate network traffic may comprise a plurality of constituent network data traffic portions.

The plurality of services may be services operating over the network. For example, the network may be a mobile service network, and the plurality of services may include mobile games, messaging apps, social media, video streaming platforms and audio streaming platforms.

The neural network may comprise a plurality of layers, wherein each layer is responsible for completing a portion of the overall task or problem. Typically, one layer provides its output as an input to another layer and a final layer will output the desired final output of the neural network.

The method may further comprise the step of retraining the neural network. The step of retraining the neural network may comprise comparing per-service traffic consumption measured at a predetermined time with a predicted per-service traffic consumption corresponding to said predetermined time. The step of retraining the neural network may further comprise determining a prediction error by calculating a difference between the measured per-service traffic consumption and the predicted per-service traffic consumption. The step of retraining the neural network may further comprise amending at least one function of the neural network such that the prediction error is reduced. In this way, the neural network may be retrained such that the method provides a more accurate prediction.

The step of amending at least one function of the neural network such that the prediction error is reduced may only be undertaken if the prediction error is above a predetermined prediction error threshold value. In this way, retraining of the neural network may only be undertaken if the accuracy of the prediction falls outside of a predetermined acceptable error limit.

The method may further comprise the step of retraining the neural network. The step of retraining the neural network may include periodic retraining of the neural network to refine the neural model following changes in the network data landscape. The step of retraining the neural network may comprise calculating a maximum likelihood estimation between a measured per-service traffic consumption and the predicted future per-service traffic consumption. The maximum likelihood estimation may be calculated for at least one of the plurality of distributed source locations. Alternatively, or additionally, the maximum likelihood estimation may be calculated for at least one of the plurality of services operating over the network. The step of retraining the neural network may further comprise amending at least one function of the neural network to increase the maximum likelihood estimation. In this way, the neural network may be retrained such that the method provides a more accurate prediction.

The step of amending at least one function of the neural network to increase the maximum likelihood estimation may only be undertaken if the calculated maximum likelihood estimation is below a predetermined maximum likelihood estimation threshold value. In this way, retraining of the neural network may only be undertaken if the accuracy of the prediction falls outside of a predetermined acceptable error limit.

The step of retraining the neural network may comprise calculating a maximum likelihood estimation between a measured per-service traffic consumption for each of the plurality of distributed source locations and the predicted future per-service traffic consumption. Alternatively, or additionally, the step of retraining the neural network may comprise calculating a maximum likelihood estimation between a measured per-service traffic consumption for each of the plurality of services operating over the network and the predicted future per-service traffic consumption. In this way, the entirety of the data may be taken into account to allow for a more accurate comparison between the predicted and measured per-service traffic consumptions.

The step of retraining the neural network may be based upon a subset of input data collected at only a portion of the plurality of distributed source locations. In this way, the retraining may be less resource intensive, when compared to a retraining based on the entirety of the input data.

The neural network may be trained with a cross-entropy function or a mean square error loss function.

The measured per-service mobile traffic data may be obtained from deep packet inspection. Accordingly, the predicted per-service traffic consumption may be compared with a measured per-service traffic consumption which has been obtained via an accurate method. Deep packet inspection may be undertaken periodically in order to reduce the resource requirements.

The step of employing 3D deformable convolutions to at least partially mitigate spatial displacements introduced during the conversion of the input data may include rearranging the converted data. In this way, the method may at least partially compensate for errors introduced during the conversion of the input data into a form suitable for further analysis.

The method may further comprise the step of allocating network resources based on the predicted future service-wise traffic consumption. For example, for a 5G mobile telecoms network, the predicted future service-wise traffic consumption may be used during future network slicing. In this way, the future network slicing may be better tailored to the future network traffic, which may mean the users of the network experience a better connection to the network, including fewer interruptions and lower latency.

The method may further comprise the step of reallocating network resources based on a further predicted future service-wise traffic consumption. For example, a first prediction may be made and 5G network slicing undertaken accordingly, and then a second prediction may be made at a later time or date and the 5G network slicing may be undertaken a second time such that the network slicing is better suited to the second prediction.

The aggregate network traffic data may be encrypted. In this way, the privacy and or security of the user data, and the confidentiality of the flow-level traffic generated by each service provider may be maintained.

The method may further comprise the step of performing adaptive weighting by assigning a weight to at least one snapshot. The weight applied may be dependent on a time of capture of data included in said snapshot. A first snapshot captured at a first time may be assigned a different weight when compared to a second snapshot captured at a second time, wherein the second time is more recent than the first time. The weight assigned may be a lesser weight. Accordingly, snapshots including data collected more recently may be assigned a greater weight, when compared to snapshots including data collected less recently. In this way, the method may apply a greater weight to traffic data collected or received most recently. Therefore, the prediction may be based more heavily on the most recent traffic data, and may not be skewed by historical data which may no longer be as relevant as recent data.

The plurality of outputs extracted from the converted data may comprise a plurality of feature maps. Each feature map may correspond to decomposed traffic volume of one service of the plurality of services operating over the network. The prediction of a future per-service traffic consumption may be based on the plurality of feature maps.

The step of converting the input data into a format suitable for further analysis by re-arranging and mapping the locations of the plurality of source locations such that the source locations are arranged in a regular grid pattern may comprise constructing a regular grid including a number of grid points equal to the number of the plurality of distributed source locations. The step of converting the input data into a format suitable for further analysis by re-arranging and mapping the locations of the plurality of source locations such that the source locations are arranged in a regular grid pattern may further comprise performing a one-to-one source location to grid point association, such that a single grid point relates to a single source location. In this way, an irregularly distributed plurality of source locations may be mapped onto a regular grid or matrix, which may then be manipulated to provide the predictions.

The one-to-one source location to grid point association may be performed in such a manner as to minimise an average spatial displacement of the source locations when they are associated to a respective grid point. In this way, spatial distortions in the converted data may be minimised.

The one-to-one source location to grid point association may be performed in such a manner as to minimise an average spatial displacement of a portion of the source locations when they are associated to a respective grid point. In this way, spatial distortions of a main or most relevant portion in the converted data may be minimised. For example, the spatial distortion of source locations in a centre of an urban area of interest may be minimised, whilst peripheral source locations may be more heavily distorted.

The one-to-one source location to grid point association may be performed using a combinatorial optimisation algorithm. The one-to-one source location to grid point association may be performed using the Hungarian Algorithm.

The at least one intermediate output may comprise at least one spatiotemporal pattern. The spatiotemporal correlations and/or spatiotemporal patterns may be abstract and/or hidden in the input data.

When making the prediction, the method may take, as a further input, further information that is unrelated to the data contained in the snapshots. For example, the further information may be a date and a time. It may be expected that traffic in a mobile telecoms network may increase at midnight on New Years Eve, due to users of the network sending good will messages or the like. Such an increase in the traffic may not be discernible from previous data alone. Accordingly, providing the data and time may allow the method to make a more accurate prediction. Traffic data from previous years may be taken into account to allow the method to more accurately predict future per-service traffic consumption.

According to a second aspect of the present invention, there is provided an apparatus comprising at least one processor, wherein the at least one processor is configured to be operable to execute the method of the first aspect of the present invention. The apparatus may further comprise a memory operatively coupled to the at least one processor. The apparatus may further comprise at least one receiver configured to receive the input data.

DETAILED DESCRIPTION

FIG. 1 is a schematic diagram outlining the steps of a method of decomposing data.

FIG. 1 is a schematic diagram 100 outlining the steps of a method of decomposing data. The first step 110 is to receive input data. Alternatively, the method may include a step prior to the first step 110 of collecting the input data from the distributed source locations. The input data typically comprises aggregate network traffic data collected from a plurality of distributed source locations. The aggregate data typically includes traffic data corresponding to a plurality of services operating over the network. The network may be a mobile service network, such as a 4G or 5G network. The aggregate data may therefore comprise all data moving about the network, and may include traffic data corresponding to a plurality of services operating over the mobile service network, such as mobile gaming and video streaming, among others.

The second step 120 is to convert the input data into a format suitable for further analysis. The conversion typically involves re-arranging and mapping the locations of the plurality of source locations such that the source locations are arranged in a regular grid pattern. The source locations may be the locations of a plurality of antennae which form part of the physical infrastructure of the mobile service network. The antennae may be distributed over an urban area, and may be separated by distances in the order or metres or kilometres. It is clear that the positions of the antennae will not be in a regular, grid-like, arrangement because their positioning is based on local demand and topography. Accordingly, to convert the input data into a regular, grid-like, arrangement suitable for further processing, it is clear that the positions must be rearranged. The conversion also typically involves separating the aggregate network traffic data into a time-dependent sequence of snapshots. Accordingly, the data may be given a timestamp and organised into a sequential order.

The third step 130 is to analyse the converted data with a neural network. The neural network typically includes a plurality of neural layers. The analysis is typically used to extract, in a final neural layer of the plurality of neural layers, a plurality of outputs from the converted data. Each output typically corresponds to decomposed traffic volume of one service of the plurality of services operating over the network. For example, each output may correspond to one service operating over the mobile service network. As such, a single output may be extracted for each of the services, such as mobile gaming and video streaming.

The analysis at the third step 130 typically includes several analysis steps, which may be carried out in any order.

One analysis step is to determine a fraction of traffic that belongs to each of the plurality of services at each of the plurality of sources. Accordingly, a fraction of traffic belonging to each of the plurality of services for the past collected data may be determined. For example, the fraction of the aggregate data corresponding to each of the plurality of services in a timeframe immediately preceding the present time may be determined.

Another analysis step is to employ 3D deformable convolutions to at least partially mitigate spatial displacements introduced during the conversion of the input data and determine at least one intermediate output from the converted data. The at least one intermediate output may be abstract and may not have any significance without being processed further.

Another analysis step is to determine spatiotemporal correlations from the determined at least one intermediate output. 2D convolutions may then be employed to extract a plurality of outputs from the determined spatiotemporal correlations.

The fourth step 140 is typically predicting, based on the plurality of outputs obtained via the analysis in the third step 130, a future per-service traffic consumption. The predicted future per-service traffic consumption may reflect an expected future traffic in or on the network.

Although the network described herein is a mobile service network, it is to be understood that the method described herein is equally applicable to other networks, such as a WiFi network, a mobile telecoms service network, a broadband network, an Internet of Things sensor and actuator network, a distributed electricity distribution grid, a network of electricity consumption sensors, roadways, airways, shipping lanes, a network of air quality sensors, a network of household water or gas consumption meters, or a social network. Furthermore, any or each of the other steps described herein may be incorporated into the method. In particular, the predicted future per-service traffic consumption may be used to allocate network resources. It is also to be understood that alternative analysis methods, other than a neural network, 3D deformable convolutions and 2D convolutions as described herein, may be provided. Additionally, it is to be understood that the neural network, 3D deformable convolutions and 2D convolutions as described herein may function or operate in a different manner yet still output and/or obtain the same result, which is ultimately a predicted future per-service traffic consumption.

The disclosure of the present invention may be better understood with reference to the following paragraphs from the research paper entitled "Mobile Service Traffic Decomposition for Network Slicing Using Deep Learning" which is incorporated herein in its entirety, and is not limiting on the scope of the claimed invention which is set out in the claims included herein.

The invention claimed is:

1. A distributed network traffic data decomposition method comprising the steps of:
   receiving input data comprising aggregate network traffic data from a plurality of distributed source locations, wherein the aggregate network traffic data includes traffic data comprising a summation over a plurality of services operating over the network;
   converting the input data into a format suitable for further analysis by re-arranging and mapping the locations of the plurality of source locations such that the source locations are arranged in a regular grid pattern and separating the aggregate network traffic data into a time-dependent sequence of snapshots;
   analysing the converted data with a neural network, comprising a plurality of neural layers, to extract, in a final neural layer of the plurality of neural layers, a first plurality of outputs from the converted data, wherein each output of the first plurality of outputs corresponds to decomposed traffic volume of one service of the plurality of services operating over the network; and
   employing 2D convolutions to extract a second plurality of outputs from determined spatiotemporal correlations; and
   predicting, based on the first and second plurality of outputs, a future per-service traffic consumption.

2. The distributed network traffic data decomposition method of claim 1,
   wherein the step of analysing the converted data with a neural network includes:
   determining a fraction of traffic that belongs to each of the plurality of services at each of the plurality of sources;
   employing 3D deformable convolutions to:
      at least partially mitigate spatial displacements introduced during the conversion of the input data; and
      determine at least one intermediate output from the converted data;
   determining spatiotemporal correlations from the determined at least one intermediate output; and
   employing 2D convolutions to extract the second plurality of outputs from the determined spatiotemporal correlations.

3. The distributed network traffic data decomposition method of claim 2, wherein the at least one intermediate output comprises at least one spatiotemporal pattern.

4. The distributed network traffic data decomposition method of claim 1, further comprising a step of retraining the neural network by:
   comparing per-service traffic consumption measured at a predetermined time with a predicted per-service traffic consumption corresponding to said predetermined time;
   determining a prediction error by calculating a difference between the measured per-service traffic consumption and the predicted per-service traffic consumption; and
   amending at least one function of the neural network such that the prediction error is reduced.

5. The distributed network traffic data decomposition method of claim 4, wherein the step of amending at least one function of the neural network such that the prediction error is reduced is only undertaken if the prediction error is above a predetermined prediction error threshold value.

6. The distributed network traffic data decomposition method of claim 4, wherein the step of retraining the neural network is based upon a subset of input data collected at only a portion of the plurality of distributed source locations.

7. The distributed network traffic data decomposition method of claim 4, wherein the neural network is trained with a cross-entropy function.

8. The distributed network traffic data decomposition method of claim 4, wherein measured per-service mobile traffic data is obtained from deep packet inspection.

9. The distributed network traffic data decomposition method of claim 1, further comprising a step of retraining the neural network by:
   calculating a maximum likelihood estimation between a measured per-service traffic consumption for at least one of the plurality of distributed source locations and for at least one of the plurality of services operating over the network and the predicted future per-service traffic consumption; and
   amending at least one function of the neural network to increase the maximum likelihood estimation.

10. The distributed network traffic data decomposition method of claim 9, wherein the step of amending at least one function of the neural network to increase the maximum likelihood estimation is only undertaken if the calculated maximum likelihood estimation is below a predetermined maximum likelihood estimation threshold value.

11. The distributed network traffic data decomposition method of claim 9, wherein the step of retraining the neural network comprises calculating a maximum likelihood estimation between a measured per-service traffic consumption for each of the plurality of distributed source locations and for each of the plurality of services operating over the network and the predicted future per-service traffic consumption.

12. The distributed network traffic data decomposition method of claim 1, wherein a step of employing 3D deformable convolutions to at least partially mitigate spatial displacements introduced during the conversion of the input data includes rearranging the converted data.

13. The distributed network traffic data decomposition method of claim 1, further comprising a step of allocating network resources based on the predicted future service-wise traffic consumption.

14. The distributed network traffic data decomposition method of claim 13, further comprising the step of reallocating network resources based on a further predicted future service-wise traffic consumption.

15. The distributed network traffic data decomposition method of claim 1, wherein the aggregate network traffic data is encrypted.

16. The distributed network traffic data decomposition method of claim 1, further comprising a step of collecting the input data.

17. The distributed network traffic data decomposition method of claim 16, wherein the step of collecting the input data comprises data collection without deep packet inspection.

18. The distributed network traffic data decomposition method of claim 1, further comprising a step of performing adaptive weighting by assigning a weight to at least one snapshot, wherein the weight applied is dependent on a time of capture of data included in said snapshot.

19. The distributed network traffic data decomposition method of claim 18, wherein a first snapshot captured at a first time is assigned a different weight when compared to a second snapshot captured at a second time, wherein the second time is more recent than the first time.

20. The distributed network traffic data decomposition method of claim 1, wherein the first plurality of outputs extracted from the converted data comprises a plurality of feature maps, wherein each feature map corresponds to decomposed traffic volume of one service of the plurality of services operating over the network, and wherein the prediction of a future per-service traffic consumption is based on the plurality of feature maps.

21. The distributed network traffic data decomposition method of claim 1, wherein the network is a mobile telecoms service network.

22. The distributed network traffic data decomposition method of claim 1, wherein the step of converting the input data into a format suitable for further analysis by re-arranging and mapping the locations of the plurality of source locations such that the source locations are arranged in a regular grid pattern comprises constructing a regular grid including a number of grid points equal to the number of the plurality of distributed source locations, and performing a one-to-one source location to grid point association, such that a single grid point relates to a single source location.

23. The distributed network traffic data decomposition method of claim 22, wherein the one-to-one source location to grid point association is performed in such a manner as to minimise an average spatial displacement of a portion or all of the source locations when they are associated to a respective grid point.

24. The distributed network traffic data decomposition method of claim 22, wherein the one-to-one source location to grid point association is performed using the Hungarian Algorithm.

25. The distributed network traffic data decomposition method of claim 1, wherein the network is a WiFi network.

26. The distributed network traffic data decomposition method of claim 1, wherein the network is a broadband network.

27. The distributed network traffic data decomposition method of claim 1, wherein the network is an Internet of Things sensor and actuator network.

28. The distributed network traffic data decomposition method of claim 1, wherein the network is one of a distributed electricity distribution grid, a network of electricity consumption sensors, roadways, airways, shipping lanes, a network of air quality sensors, a network of household water or gas consumption meters, or a social network.

29. An apparatus comprising at least one processor, wherein the at least one processor is configured to be operable to:
  (i) receive input data comprising aggregate network traffic data from a plurality of distributed source locations, wherein the aggregate network traffic data includes traffic data comprising a summation over a plurality of services operating over the network;
  (ii) convert the input data into a format suitable for further analysis by re-arranging and mapping the locations of the plurality of source locations such that the source locations are arranged in a regular grid pattern and separate the aggregate network traffic data into a time-dependent sequence of snapshots;
  (iii) analyze the converted data with a neural network, comprising a plurality of neural layers, to extract, in a final neural layer of the plurality of neural layers, a first plurality of outputs from the converted data, wherein each output of the first plurality of outputs corresponds to decomposed traffic volume of one service of the plurality of services operating over the network; and
  (iv) employ 2D convolutions to extract a second plurality of outputs from determined spatiotemporal correlations; and
  (v) predict, based on the first and second plurality of outputs, a future per-service traffic consumption.

30. The apparatus of claim 29, wherein the network is a mobile telecoms service network.

* * * * *